United States Patent [19]
Reich et al.

[11] Patent Number: 6,143,233
[45] Date of Patent: Nov. 7, 2000

[54] POLYMERS CONTAINING 2,3-DIHYDROFURAN GROUPS

[75] Inventors: Wolfgang Reich, Maxdorf; Reinhold Schwalm, Wachenheim; Erich Beck, Ladenburg; Lukas Häussling, Bad Dürkheim; Oskar Nuyken, München, all of Germany; Roman-Benedikt Raether, Austin, Tex.

[73] Assignee: BASF Aktiengesellschaft, Ludwigshafen, Germany

[21] Appl. No.: 09/142,171

[22] PCT Filed: Mar. 10, 1997

[86] PCT No.: PCT/EP97/01206

§ 371 Date: Sep. 22, 1998

§ 102(e) Date: Sep. 22, 1998

[87] PCT Pub. No.: WO97/35907

PCT Pub. Date: Oct. 2, 1997

[30] Foreign Application Priority Data

Mar. 22, 1996 [DE] Germany ............ 196 11 349

[51] Int. Cl.$^7$ .......... C08G 65/14; C08G 65/16; G03F 7/038; C08F 2/46; C08F 8/14

[52] U.S. Cl. .......... 264/496; 264/488; 522/154; 522/166; 522/162; 522/150; 522/153; 528/405; 528/407; 528/417

[58] Field of Search .......... 528/417, 403, 528/405, 407; 522/149, 150, 151, 152, 153, 154, 155, 156, 157, 158, 159, 160, 161, 162, 163, 164, 165, 166; 264/496, 488

[56] References Cited

U.S. PATENT DOCUMENTS

| | | |
|---|---|---|
| 3,881,935 | 5/1975 | Appellaniz . |
| 4,060,685 | 11/1977 | Maekawa et al. . |
| 4,079,038 | 3/1978 | Choi et al. ............ 528/86 |
| 4,816,496 | 3/1989 | Wada et al. . |
| 5,102,771 | 4/1992 | Vogel et al. ............ 430/270.1 |

FOREIGN PATENT DOCUMENTS

| | | |
|---|---|---|
| 0 076 158 | 4/1983 | European Pat. Off. . |
| 0 119 017 | 9/1984 | European Pat. Off. . |
| 0 123 912 A1 | 11/1984 | European Pat. Off. . |
| 195 39 294 A1 | 4/1997 | Germany . |

OTHER PUBLICATIONS

Database WPI, Section CH, Week 9404, Derwent Publications Ltd., London, GB; Class A26, AN 94–031872; "Heat Resistant Photosensitive Material Useful As Insulating Material For Semiconductor Device", Dec. 21, 1993, (abstract).

Simmons, H.E. et al.; "Phototakification of Polymer Blends", J. Applied Polymer Science, vol. 52, 1994, pp. 727–735.

Nuyken O. and Aechtner S.; "Cationic Polymerization of Selected α– and β–substituted Vinyl Ethers", Polymer Bulletin 26, 117–122 (1992).

*Primary Examiner*—Susan W. Berman
*Attorney, Agent, or Firm*—Oblon, Spivak, McClelland, Maier & Neustadt, P.C.

[57] ABSTRACT

A polymer which can be crosslinked by high-energy radiation and contains from 0.1 to 50% by weight, based on the polymer, of 2,3-dihydrofuran groups or derivatives thereof, each calculated as 2,3-dihydrofuran.

12 Claims, No Drawings

POLYMERS CONTAINING 2,3-DIHYDROFURAN GROUPS

The invention relates to a polymer which can be crosslinked by high-energy radiation and contains from 0.05 to 50% by weight, based on the polymer, of 2,3-dihydrofuran groups or derivatives thereof, each calculated as 2,3-dihydrofuran, and to a process for preparing coatings and moldings by radiation curing.

The radiation curing of free-radically or cationically polymerizable compounds is generally known. The radiation curing of acrylates has acquired particular industrial importance. A fundamental problem with acrylates, however, is that photopolymerization is inhibited by oxygen.

Since the problem of oxygen inhibition does not occur with cationic photopolymerization, cationically polymerizable compounds are a possible alternative to their free-radically polymerizable counterparts. However, the curing rate and performance properties of the resulting coatings or moldings must be comparable with, and where possible at least as good as, those of the free-radically polymerizable compounds, especially the acrylates.

EP-A-123 912 describes dihydropyrans as cationically polymerizable, cyclic vinyl ethers for radiation curing. The curing rate, i.e. the reactivity during radiation curing, however, is still completely inadequate.

Dihydrofurans and their thermal, cationic polymerization per se are known, for example from Polymer Bulletin 28 (1992) 117–122.

The earlier but nonprior-published German Patent Application P 19539294.9 (OZ 46308) discloses the radiation curing of 2,3-dihydrofurans.

It is an object of the present invention, therefore, to provide a process for preparing coatings or moldings by radiation curing which is subject to little or no oxygen inhibition, where the compounds employed are of maximum reactivity and where the performance properties of the resulting coatings and moldings are satisfactory.

We have found that this object is achieved by the polymer defined at the outset.

The 2,3-dihydrofuran groups in the polymer can be polymerized cationically by means of high-energy radiation (without oxygen inhibition), resulting in an increase in molecular weight or in crosslinking of the polymer (in short, curing).

The novel polymer contains from 0.05 to 50% by weight, preferably from 0.05 to 20% by weight and, with particular preference, from 0.05 to 10% by weight, based on the total weight of the polymer, of 2,3-dihydrofuran groups or derivatives thereof, every dihydrofuran group and every derivative thereof being calculated as 2,3-dihydrofuran.

The dihydrofurans involved are preferably those of the formula

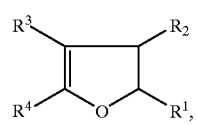

I where $R^1$–$R^4$ independently are hydrogen or a hydrocarbon radical of 1 to 15 carbons and one of $R^1$–$R^4$ is replaced by the bond to the polymer.

$R^1$–$R^4$ are preferably hydrogen or $C_1$–$C_{10}$-alkyl, particularly preferably hydrogen. The bond with the polymer is preferably from the carbon of the $R^2$ substituent, so that $R^2$ is absent from the above formula.

The novel polymer is obtainable by reacting polymers containing functional groups (termed functional polymers for short) with 2,3-dihydrofuran derivatives containing at least one, preferably one or two but especially one, group which is reactive with the functional groups (termed reactive 2,3-dihydrofuran derivatives for short).

The functional polymers may for example contain acid groups, especially carboxyl, anhydride, especially carboxylic anhydride, epoxide, halo, especially carbonyl halide groups, hydroxyl, primary or secondary amino or isocyanato, which are capable of reaction with the reactive dihydrofuran derivatives.

The functional polymers are obtainable in particular by free-radical polymerization of ethylenically unsaturated compounds (monomers).

The functional polymer and thus the novel polymer as well are composed largely of monomers a), called principal monomers, which are selected from $C_1$–$C_{20}$-alkyl (meth)acrylates, vinyl esters of carboxylic acids containing up to 20 carbons, vinyl-aromatic compounds having up to 20 carbons, ethylenically unsaturated nitriles, vinyl halides, vinyl ethers of $C_1$–$C_{10}$ alcohols, aliphatic hydrocarbons having 2 to 8 carbons and 1 or 2 double bonds, or mixtures of these monomers.

Examples are $C_1$–$C_{10}$-alkyl (meth)acrylates, such as methyl methacrylate, methyl acrylate, n-butyl acrylate, ethyl acrylate and 2-ethylhexyl acrylate.

In particular, mixtures of the alkyl (meth)acrylates are also suitable.

Examples of vinyl esters of carboxylic acids having 1 to 20 carbons are vinyl laurate, stearate and propionate and versatic acid vinyl ester.

Suitable vinyl-aromatic compounds are vinyl toluene, α- and p-methylstyrene, α-butylstyrene, 4-n-butylstyrene, 4-n-decylstyrene and, preferably, styrene. Examples of nitriles are acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers are vinyl methyl ether and vinyl isobutyl ether. Vinyl ethers of $C_1$–$C_4$ alcohols are preferred.

As hydrocarbons having 2 to 8 carbons and two olefinic double bonds, mention may be made of butadiene, isoprene and chloroprene.

Particularly preferred principal monomers are $C_1$–$C_{20}$-alkyl (meth)acrylates.

At least 30% by weight, in particular at least 50% by weight and, with particular preference, at least 70% by weight of the functional polymer comprises the principal monomers.

In addition to the principal monomers, the functional polymer includes monomers b) having the abovementioned functional groups which react with the reactive 2,3-dihydrofuran derivatives.

Examples of monomers b) are (meth)acrylic acid, maleic acid, itaconic acid, maleic anhydride, glycidyl (meth)acrylate, isocyanatoalkyl (meth)acrylates, aminoalkyl (meth)acrylates and hydroxyalkyl (meth)acrylates.

The proportion of monomer b) generally corresponds to the desired content of 2,3-dihydrofuran groups of the formula I; i.e., the quantity of functional groups in the polymer is preferably equimolar with the reactive groups of the reactive 2,3-dihydrofuran derivatives.

Besides monomers a) and b), the functional polymer may also contain further monomers c), for example crosslinking monomers such as divinylbenzene.

Free-radical polymerization to prepare the functional polymer can be carried out in solution, for example in an organic solvent (solution polymerization), in aqueous dispersion (emulsion polymerization, suspension polymerization) or in bulk, i.e. essentially in the absence of water or organic solvents (bulk or mass polymerization).

The emulsion polymerization can be carried out, for example, by a batchwise procedure, with or without the use of seed latices, with some or all of the constituents of the reaction mixture being included in the initial charge, or, preferably, with portions of some or all constituents being included in the initial charge and the rest metered in, or in accordance with the metering technique, without an initial charge.

In the case of emulsion polymerization, the monomers can be polymerized as usual in the presence of a water-soluble initiator and an emulsifier, preferably at 30–95° C.

Examples of suitable initiators are sodium, potassium and ammonium persulfates, tert-butyl hydroperoxides, water-soluble azo compounds or else redox initiators such as $H_2O_2$/ascorbic acid.

Examples of emulsifiers used are alkali metal salts of relatively long-chain fatty acids, alkyl sulfates, alkylsulfonates, alkylated arylsulfonates or alkylated biphenyl ether sulfonates. Other suitable emulsifiers are reaction products of alkylene oxides, especially ethylene oxide or propylene oxide with fatty alcohols, fatty acids or phenol, or alkylphenols.

In the case of aqueous secondary dispersions, the copolymer is first of all prepared by solution polymerization in an organic solvent and then dispersed in water without using an emulsifier or dispersion auxiliary but with the addition of salt formers, for example ammonia, to give carboxyl-containing copolymers. The organic solvent can be removed by distillation. The preparation of aqueous secondary dispersions is known to the skilled worker and is described, for example, in DE-A-37 20 860.

Regulators can be used during polymerization to adjust the molecular weight. Suitable examples are —SH-containing compounds such as mercaptoethanol, mercaptopropanol, thiophenol, thioglycerol, ethyl thioglycolate, methyl thioglycolate and tert-dodecylmercaptan.

The solids content of the resulting polymer dispersions is preferably from 40 to 80% by weight, particularly preferably from 45 to 75% by weight. High polymer solids contents can be achieved using, for example, the process described in German Patent Application P 4 307 683.1 or in EP 37 923.

A particularly preferred polymerization method is solution polymerization, which can be carried out continuously, batchwise or, preferably, semicontinuously by a feed technique. In the latter case, a portion of the monomers is introduced as initial charge and heated to the polymerization temperature, and the remainder of the monomers is fed in continuously.

Examples of solvents which can be used for both the free-radical solution polymerization and for any subsequent reactions in solution are alcohols such as isobutanol and isopropanol, aromatic compounds such as toluene or xylene, ethers such as dioxane or tetrahydrofuran, ketones such as acetone or cyclohexanone, or esters such as ethyl acetate or n-butyl acetate.

Preferred initiators are dibenzoyl peroxide, tert-butyl perpivalate, tert-butyl per-2-ethylhexanoate, tert-amyl 2-ethylhexyl peroxide, di-tert-butyl peroxide, tert-butyl hydroperoxide, cumene hydroperoxide, dilauroyl peroxide, didecanoyl peroxide, methyl ethyl ketone peroxide, 2,2'-azobis(2,4-dimethylvaleronitrile), 2,2'-azobis(2,3-dimethylbutyronitrile) and 2,2'-azobisisobutyronitrile.

In the case of bulk polymerization, a portion of the polymerization batch is generally introduced as initial charge and heated to the polymerization temperature, and then the remainder is fed in continuously.

Depending on the polymerization method chosen, the functional polymer is obtained in the form of an aqueous dispersion of the polymer, as a solution in an organic solvent, or in substantially water- and solvent-free form.

It is particularly preferred to use the polymer in a substantially water- and solvent-free form. To this end the polymer is preferably prepared by solution polymerization with subsequent removal of the solvent and/or water, or by bulk polymerization.

The number-average molecular weight $M_n$ of the functional polymer is preferably 500–50,000, particularly preferably 500–20,000 and, with very particular preference, 1000–10,000, and its polydispersity, expressed as the quotient $M_w$ (weight-average molecular weight)/$M_n$<4.

$M_w$ and $M_n$ are determined by gel permeation chromatography.

To prepare the novel polymer, the functional polymer is preferably reacted with the reactive 2,3-dihydrofuran derivatives; the latter contain, in particular, a hydroxyl, carboxyl or halogen group, for example.

The reactive 2,3-dihydrofuran derivatives may include one or more dihydrofuran rings connected directly or via organic bridges. In the case of 2,3-dihydrofuran derivatives having more than one dihydrofuran ring, each such ring, calculated as dihydrofuran, is included when calculating the proportion by weight of the dihydrofuran groups (see above).

Particularly preferred reactive dihydrofuran derivatives are those of the formula

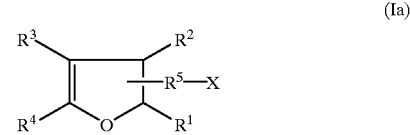

(Ia)

where $R^1$–$R^4$ independently are hydrogen or a hydrocarbon radical of 1 to 15 carbons, but one of $R^1$–$R^4$ is replaced by $R^5$—X, where $R^5$ is a single bond or a $C_1$–$C_{20}$ organic group and X is hydroxyl (OH), carboxyl (COOH) or halogen, e.g. chlorine or bromine.

Preferably, $R^2$ in the above formula I is replaced by $R^5$—X.

$R^1$–$R^4$ are preferably hydrogens.

$R^5$ is in particular a single bond ($R^5$ is therefore absent in the formula I) or is $C_1$–$C_{10}$-alkylene, preferably $C_1$–$C_4$-alkylene.

Examples of reactive 2,3-dihydrofuran derivatives are 3-hydroxymethyl-2,3-dihydrofuran, 3-carboxymethyl-2,3-dihydrofuran or a salt thereof, for example the sodium salt, or 3-bromo- (or 3-chloro)-methyl-2,3-dihydrofuran.

The preparation of reactive 2,3-dihydrofuran derivatives is disclosed, for example, by German Patent Application P 19 539 294.9.

In the case of reactive, hydroxyl-containing 2,3-dihydrofuran derivatives, the reaction takes place, for example, with functional polymers containing carboxyl, carboxylic anhydride or acyl chloride groups, or isocyanate, epoxide or halogen groups.

In the case of carboxyl-containing, reactive 2,3-dihydrofuran derivatives, reaction takes place, for example, with functional polymers containing hydroxyl, epoxide or isocyanate groups.

Reaction of the functional polymers with the reactive dihydrofuran derivatives takes place preferably in an organic solvent, for example tetrahydrofuran, toluene, etc.

The reactions involved are customary organic reactions, for example esterification (where the reacting species are hydroxyl groups on one side and carboxyl, carboxylic anhydride or acyl chloride groups on the other), or carboxyl/epoxide group reactions, or urethane formation reactions (between isocyanato and hydroxyl).

Depending on the nature of each of these types of reaction, which are sufficiently familiar to the skilled worker, they can be catalyzed by acids or bases and can, if desired, be accelerated by an increase in temperature.

Owing to their content of 2,3-dihydrofuran groups, the novel polymers can be cationically polymerized or crosslinked: in short, cured.

Cationic curing can be initiated by heat or, preferably, photochemically.

The novel polymers are preferably suitable as or in radiation-curable compositions, for example for producing coatings or moldings.

The radiation-curable compositions may additionally include further radiation-curable, cationically or free-radically polymerizable compounds.

The content of the novel polymers in the novel radiation-curable compositions is from 1 to 100% by weight, preferably from 10 to 100% by weight, particularly preferably from 40 to 100% by weight and, with very particular preference, from 70 to 100% by weight, based on the cationically and, if appropriate, free-radically polymerizable compounds.

Suitable further cationically polymerizable compounds besides the novel polymers are, in particular, linear or cyclic vinyl ethers, examples being vinyl methyl ether, vinyl ethyl ether, vinyl propyl ether, vinyl isobutyl ether, vinyl octadecyl ether and vinyl cyclohexyl ether, and α-methyl-vinyl alkyl ether, and may in particular include 2,3-dihydrofuran and 2,3-dihydrofuran derivatives as specified in particular in German Patent Application P 19539294.9.

Other suitable polymerizable compounds are epoxides, for example cyclopentene oxide, cyclohexene oxide, epoxidized polybutadiene, epoxidized soya bean oil, and Degacure K 126, or glycidyl ethers, for example butanediol diglycidyl ether, hexanediol diglycidyl ether, bisphenol-A-diglycidyl ether, for example, and pentaerythritol diglycidyl ether.

It is also possible at the same time to employ cationically polymerizable monomers, such as unsaturated aldehydes and ketones, dienes such as butadiene, vinyl-aromatic compounds such as styrene, N-substituted vinylamines such as vinylcarbazole, and cyclic ethers, such as tetrahydrofuran.

Not only cationically polymerizable compounds but also free-radically polymerizable compounds, and both free-radically and cationically polymerizable compounds, can be used at the same time. Examples worthy of mention are vinyl-aromatic compounds of up to 20 carbons, vinyl esters of carboxylic acids with up to 20 carbons, and, in particular, (meth)acrylate compounds as described, for example, in R. Holmann U. V. and E. B. Curing Formulations for Printing Inks and Paints, London 1984.

In addition to monoacrylates such as $C_1$–$C_{20}$-alkyl(meth)acrylates, compounds having two or more (meth)acrylic groups are also suitable, in particular.

Mention may be made, for example, of trimethylolpropane triacrylate, dipropylene glycol diacrylate, tripropylene glycol diacrylate, hexanediol diacrylate and polyester, polyether, epoxy and urethane acrylates.

Preference is given to (meth)acrylate compounds having 2–6, preferably 2–4, (meth)acrylic groups. The molecular weight of the acrylate compounds is preferably below 5000, particularly preferably below 3000 g/mol.

Other suitable free-radically polymerizable compounds are unsaturated polyesters.

The radiation-curable compositions preferably comprise a photoinitiator for the photopolymerization.

The total amount of photoinitiator is preferably from 0.1 to 10% by weight, particularly preferably from 0.5 to 5% by weight, based on the total amount of cationically and, if used, free-radically polymerizable compounds.

Photoinitiators for cationic photopolymerization produce acids when irradiated with UV light; examples which may be mentioned are aryldiazonium, aryliodonium or arylsulfonium salts, disulfones, diazodisulfones, imido-triflates or benzoin tosylates of the following structures:

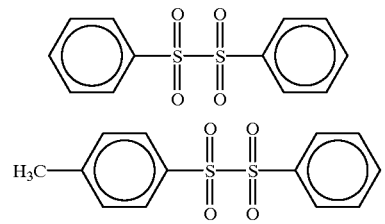

Other examples are p-methoxybenzenediazonium hexafluorophosphate, benzenediazonium tetrafluoroborate, toluenediazonium tetrafluoroarsenate, diphenyliodonium hexafluoroarsenate, triphenylsulfonium hexafluorophosphate, benzenesulfonium hexafluorophosphate, toluenesulfonium hexafluorophosphate or Degacure KI85 (bis[4-diphenylsulfoniophenyl] sulfide bishexafluorophosphate), isoquinolinium salts, phenylpyridinium salts or picolinium salts, for example N-ethoxy-isoquinolinium hexafluorophosphate, N-ethoxy-4-phenylpyridinium hexafluorophosphate or N-ethoxy-2-picolinium hexafluorophosphate. Ferrocenium salts (e.g. Irgacure 261 from Ciba) or titanocenes are also suitable.

Insofar as the radiation-curable compositions contain free-radically polymerizable compounds as well, photoinitiators for the free-radical photopolymerization are also used in accordance with the content of these compounds.

It is also possible to use only photoinitiators for the free-radical polymerization, especially when the proportion of free-radical polymerizable compounds is more than 50 mol-%, based on the total amount of polymerizable compounds.

Examples of suitable photoinitiators for free-radical polymerization are benzophenone and its derivatives, examples being alkylbenzylphenones, halomethylated benzophenones, Michler's ketone, and also benzoin and benzoin ethers, such as ethyl benzoin ether. Benzil ketals such as benzil dimethyl ketal, acetophenone derivatives, for example hydroxy-2-methyl-1-phenylpropan-1-one and hydroxycyclohexyl phenyl ketone, can also be used as such photoinitiators, as can anthraquinone and its derivatives, such as methylanthraquinone, and, in particular, acylphosphine oxides, for example Lucirin TPO (2,4,6-trimethylbenzoyldiphenylphosphine oxide) and bisacylphosphine oxides.

The radiation-curable compositions are applied to the substrates to be coated, for example wood, paper, plastic or metal, in order to produce coatings or, in order to produce moldings, are brought into the intended form.

In the case of such applications, the radiation-curable compositions may comprise the additives customary for the particular application intended.

When used as coating compositions for example, such additives may be levelling agents, reinforcing agents, pigments or fillers.

Radiation curing is preferably accomplished with UV light. Examples of UV sources suitable for this purpose are those having a wavelength range of from 240 to 400 nm and an output of from 50 to 240 W/cm.

With particular preference, the radiation-curable compositions are suitable for producing coatings on wood, plastic, paper and metal, and are crosslinked by electron beams or, following the addition of photoinitiators, by UV radiation, i.e. are cured to give coatings which conform to the requirements made of protective or decorative coatings.

The radiation-curable compositions have a high reactivity, i.e. a high curing rate in the course of radiation curing.

The resulting coatings or moldings have good performance properties.

EXAMPLES

A) Preparation of Novel Polymers

1. Polymer-analogous reaction of poly(methyl methacrylate-co-methacryloyl chloride) with 3-(hydroxymethyl)-2,3-dihydrofuran to give poly(methyl methacrylate-co-2,3-dihydrofuran-3-methyl methacrylate)

2.5 mmol of 3-hydroxymethyl-2,3-dihydrofuran are dissolved in 10 ml of absolute tetrahydrofuran, and 2.5 ml of 1 M potassium tert-butylate solution in tetrahydrofuran are added. Then 1.5 g of poly(methyl methacrylate-co-methacryloyl chloride) (ester/acid chloride=9/1; $M_n$=72,000 g/mol), dissolved in 100 ml of tetrahydrofuran, are added. The solution turns a golden yellow. It is stirred at room temperature for 12 hours and then 1 ml of 1 M sodium methylate solution in tetrahydrofuran (with a little methanol to improve solubility) is added and stirring is continued for 30 minutes. The polymer is precipitated in 500 ml of n-hexane.

B) Radiation Curing 50 mg of poly(methyl methacrylate-co-2,3-dihydrofuran-3-methyl methacrylate) and 20 mg of Irgacure® 261 (0.05 mmol) as photoinitiator are dissolved in 2 ml of chloroform, and the solution is irradiated with UV light for 15 minutes. The solution quickly becomes cloudy as the polymer is precipitated.

For purification, the crosslinked product is washed with methanol and dried at 60° C. in vacuo for 48 hours.

The product obtained is insoluble and could be characterized only by IR spectroscopy.

We claim:

1. A polymer, comprising:

0.05 to 50% by weight of at least one 2,3-dihydrofuran group per 100% by weight of said polymer;

wherein said polymer is a side chain polymer;

wherein said 2,3-dihydrofuran group is attached to said polymer via a functional group;

wherein said polymer is cross-linked by reacting the double bond of said 2,3-dihydrofuran group when exposed to high-energy radiation.

2. A polymer as claimed in claim 1, wherein said 2,3-dihydrofuran group is represented by formula (I):

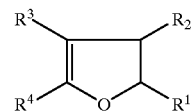

wherein
   $R^1$–$R^4$ independently are hydrogen or a hydrocarbon radical of 1 to 15 carbons; and
   one of $R^1$–$R^4$ is replaced by the bond to said side chain of said polymer.

3. A polymer as claimed in claim 1, prepared by reacting a polymer containing at least one functional group with a 2,3-dihydrofuran derivative containing at least one group which is reactive with said functional group;

wherein said reacting occurs between said functional group of said polymer and said group of said 2,3-dihydrofuran derivative reactive with said functional group.

4. A polymer as claimed in claim 3, wherein said functional group is selected from the group consisting of an acid, an epoxide, an anhydride, a hydroxyl group, a primary amino group, a secondary amino, a halogen, an isocyanato group and mixtures thereof; and wherein said group of said 2,3-dihydrofuran is reactive with said functional group is a hydroxyl group or a carboxyl group.

5. A polymer as claimed in claim 3, wherein said 2,3-dihydrofuran containing at least one group which is reactive with said functional group is represented by formula (I):

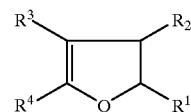

wherein
   $R^1$–$R^4$ independently are hydrogen or a hydrocarbon radical of 1 to 15 carbons; and
   one of $R^1$–$R^4$ is replaced by OH, COOH, halogen, or a $C_1$–$C_{20}$ organic group with a terminal group selected from the group consisting of OH, COOH and halogen; and
   wherein said group replacing one of $R^1$–$R^4$ is reactive with said functional group of said polymer.

6. A process for preparing the polymer of claim 3, comprising:

reacting said polymer containing at least one functional group with said 2,3-dihydrofuran derivative containing at least one group which is reactive with said functional group.

7. A process for preparing a coating, comprising:

coating a substrate with a radiation-curable composition comprising the polymer as claimed in claim 1; and exposing said coating to high-energy radiation.

8. A process for preparing a molding, comprising:

preparing a molded object from a radiation-curable composition comprising the polymer as claimed in claim 1; and irradiating said molding with high-energy radiation.

9. A coating prepared by the process of claim 7.

10. A molded object prepared by the process of claim 8.

11. A polymer, comprising:

a polymerization product of at least one monomer
wherein at least 50% by weight of said monomer comprise a monomer selected from the group consisting of a $C_1$–$C_{20}$-alkyl (meth)acrylate, a vinyl ester of a carboxylic acid containing up to 20 carbon atoms, a vinyl-aromatic compound having up to 20 carbon atoms, an ethylenically unsaturated nitrile, a vinyl halide, a vinyl ether of a $C_1$–$C_{10}$-alcohol, an aliphatic hydrocarbon having 2 to 8 carbon atoms and one or two double bonds, and mixtures thereof; and 0.05 to 50% by weight of at least one 2,3-dihydrofuran group per 100% by weight of said polymer;

wherein said polymer is a side chain polymer; and wherein said 2,3-dihydrofuran group is attached to said side chain.

12. The polymer of claim 11, wherein an amount of said monomer is at least 30% by weight per 100% by weight of said polymer.

* * * * *